US007200949B2

(12) United States Patent
Leslie et al.

(10) Patent No.: US 7,200,949 B2
(45) Date of Patent: Apr. 10, 2007

(54) MOTORIZED CHALK BOX

(76) Inventors: Troy A. Leslie, 328 Pratt Rd., Kalamazoo, MI (US) 49001; Bill Elliott, 1525 Evanston Ave., Kalamazoo, MI (US) 49008

( * ) Notice: Subject to any disclaimer, the term of this patent is extended or adjusted under 35 U.S.C. 154(b) by 43 days.

(21) Appl. No.: 11/207,952

(22) Filed: Aug. 22, 2005

(65) Prior Publication Data

US 2007/0039195 A1 Feb. 22, 2007

(51) Int. Cl.
*B44D 3/38* (2006.01)
*G01B 3/10* (2006.01)

(52) U.S. Cl. ............................ 33/414; 33/770; 33/758

(58) Field of Classification Search .................. 33/414, 33/413, 1 LE, 770, 757, 758, 759, 760, 761, 33/768, 769
See application file for complete search history.

(56) References Cited

U.S. PATENT DOCUMENTS

| | | | | |
|---|---|---|---|---|
| 680,557 | A | 8/1901 | Wilson | 33/414 |
| 1,100,325 | A * | 6/1914 | Pronovost | 33/758 |
| 1,290,350 | A * | 1/1919 | Rand | 33/770 |
| 1,407,429 | A * | 2/1922 | Simmons | 33/758 |
| 2,549,287 | A * | 4/1951 | Brennan | 33/758 |
| 2,770,883 | A * | 11/1956 | Hackney | 33/770 |
| 3,183,595 | A * | 5/1965 | Jopperi | 33/408 |
| 4,561,189 | A * | 12/1985 | Hirneise | 33/408 |
| 4,565,011 | A | 1/1986 | Karger | 33/414 |
| 4,765,557 | A | 8/1988 | Kahmann | 242/381.6 |
| 4,773,162 | A * | 9/1988 | Lin | 33/414 |
| 4,819,337 | A * | 4/1989 | Noyes | 33/414 |
| 5,042,613 | A * | 8/1991 | Hermann | 182/18 |
| 5,163,230 | A | 11/1992 | Gast | 33/392 |
| 5,212,875 | A | 5/1993 | Corso | 33/414 |
| 5,444,919 | A | 8/1995 | Alves | 33/414 |
| 5,470,029 | A | 11/1995 | Dufour | 242/394 |
| 5,509,616 | A * | 4/1996 | Millen et al. | 242/381.5 |

(Continued)

FOREIGN PATENT DOCUMENTS

JP 55-052865 4/1980

(Continued)

OTHER PUBLICATIONS

Website, "http://www.kaufmann-goefis.at/en/10products/99schlagschnur," Kaufmann Chalk Line Marker, One Page, Printed Mar. 15, 2005.

*Primary Examiner*—Diego Gutierrez
*Assistant Examiner*—Amy R. Cohen
(74) *Attorney, Agent, or Firm*—Richard C. Litman

(57) ABSTRACT

The motorized chalk box includes a chalk line reel having an internal ring gear. An electric motor drives a pinion gear, which engages the ring gear, thus resulting in a very compact assembly. The motor and gearing are sealed from the chalk dust reservoir, through which the chalk line passes. The housing comprises two components secured by a single screw to facilitate minor maintenance. A spring loaded, automatically releasing line clip extends from the distal end of the chalk line. The line clip includes a spring-loaded sleeve, which is biased against the anchor (screw, nail, etc.) when in place. Releasing the tension on the chalk line causes the sleeve to spring against the anchor, thus kicking the line clip away from the anchor. The chalk box may thus be operated using only one hand, greatly improving safety for workers in elevated environments.

13 Claims, 5 Drawing Sheets

U.S. PATENT DOCUMENTS

| | | | | |
|---|---|---|---|---|
| 5,683,055 | A | 11/1997 | Dufour | 242/394 |
| 5,822,874 | A | 10/1998 | Nemes | 33/414 |
| 5,920,997 | A * | 7/1999 | Girtman | 33/414 |
| 5,937,532 | A * | 8/1999 | Eirich et al. | 33/758 |
| 5,947,790 | A | 9/1999 | Gordon | 446/247 |
| 6,289,597 | B1 | 9/2001 | Beyers | 33/414 |
| D454,804 | S | 3/2002 | Zuniga | D10/65 |
| 6,705,018 | B2 * | 3/2004 | Guhse | 33/414 |
| D490,329 | S | 5/2004 | Glessman | D10/65 |
| 6,745,485 | B2 | 6/2004 | Shor | 33/414 |
| D493,377 | S | 7/2004 | Brugger | D10/65 |
| 6,931,743 | B1 * | 8/2005 | Scarborough | 33/414 |
| 2002/0194744 | A1 | 12/2002 | Shor | 33/414 |
| 2003/0221325 | A1 | 12/2003 | Dekort | 33/414 |

FOREIGN PATENT DOCUMENTS

| | | |
|---|---|---|
| JP | 63-082302 | 4/1988 |

* cited by examiner

MOTORIZED CHALK BOX

BACKGROUND OF THE INVENTION

1. Field of the Invention

The present invention relates to tools and equipment used in carpentry and related fields. More specifically, the present invention comprises a chalk box and chalk line used for marking guidelines on construction materials and other surfaces. The chalk box may include an electric motor for rewinding the chalk line after use, and may include a line clip having a spring-biased line clip that can be released from an anchor without manual intervention.

2. Description of the Related Art

Chalk lines have been in common use for laying out straight lines for cutting, nailing, etc. on construction materials, for a considerable time. The basic process involves coating or impregnating a pervious string or line with chalk dust, stretching the line taut along the surface to be marked, and snapping the taut line against the surface. The chalk dust, which is shaken from the line as it impacts the surface, instantly marks a straight line along the surface of the material being marked.

Various containers, or "chalk boxes," have been developed to store such chalk lines. In its simplest form, such a container comprises an open reel upon which the chalk line is wound. More complex devices have been developed, in which the chalk line is wound upon a closed reel by an external crank. Many such devices include a reservoir or compartment for containing chalk dust to automatically impregnate or coat the chalk line with dust as the line passes therethrough, and may include means for removing excessive dust as the line passes from the reel or box.

Still other chalk boxes have been developed which include a coil spring that biases the reel to retract the line after use. While this facilitates the rewinding of the chalk line, the force of the coil spring generally results in relatively rapid retraction of the chalk line into the housing or box, if the retraction speed is unchecked. This can result in the line clip at the end of the chalk line, flailing about and potentially causing injury.

The present inventors are aware of certain spring-powered devices developed in the past for the purpose of rewinding a cord or line. An example of such is found in Japanese Patent Publication No. 55-052,865 published on Apr. 17, 1980. This patent publication discloses (according to the drawings and English abstract) an electric cord reel having a cam actuated release mechanism to allow the cord to be retracted onto the reel without locking up the reel rotation.

Another spring wound device is found in Japanese Patent Publication No. 63-082,302, published on Apr. 13, 1988. This device comprises (according to the drawings and English abstract) a spring-wound rope or line, which is used for measuring a distance or span. The distance may be determined according to the spring travel within the device, with an electronic sensor and optical pickup determining the spring travel.

A small number of mechanized chalk boxes have been developed which utilize an electric motor to rewind the chalk line after use. This results in a somewhat slower and more uniform retraction speed for the line, which provides a safer operation of the retraction process. However, most such devices are relatively bulky due to the location of the electric motor relative to the chalk line reel and remaining components.

Regardless of the principle used to rewind the chalk line, all such devices include some means of temporarily holding or securing the distal end of the chalk line to the opposite side of the range to be marked. Such line clips generally include a slot that may be hooked over the protruding head or end of a nail or screw, and a bend which may be hooked over the edge or end of a panel, wall stud, etc. Such devices are generally easily removed once the line is marked, but also generally require a second person at the opposite end of the chalk line to remove the clip when it is installed over a screw or nail. This is not a major problem when working on a floor or similar surface, as the person controlling the chalk box need only walk to the opposite end of the line to unhook the clip himself. However, the task becomes somewhat more involved when working on a narrow scaffold or between stories, etc. The assistance of a second person in such circumstances is practically essential, in order to avoid the need to continually move up and down ladders, climb and descend scaffolding, etc.

None of the above inventions and patents, taken either singly or in combination, is seen to describe the instant invention as claimed. Thus, a motorized chalk box solving the aforementioned problems is desired.

SUMMARY OF THE INVENTION

The motorized chalk box is a chalk box with an electric motor for retracting the chalk line. The chalk box may include a chalk line reel or spool having an internal ring gear, and an electric motor driving a pinion gear, which meshes with the internal ring gear of the reel. The result is a very compact assembly with long life in the gearing and quiet operation. The chalk line passes through a chalk dust reservoir or container, with the motor and gearing being sealed away from the dust reservoir. Opposed upper and lower shells are secured together by a single screw to complete the assembly. This construction enables the user to quickly and easily perform any minor maintenance or repairs as needed. Separate access is provided to the battery and for replenishing the chalk dust reservoir.

The present invention also relates to a chalk box having an automatically releasing line clip at the distal end of the chalk line. The line clip has a spring-biased sleeve, which is biased against an anchor (nail shank, etc.) when the line is extended. When tension on the line is suddenly released, the spring(s) kick(s) the sleeve against the anchor, contacting the anchor and kicking it from its retaining slot within the clip, thus releasing the clip from the anchor without need of an assistant to remove the clip from the anchor. The chalk box may thus be used without need of a second person to assist in releasing the clip, retrieving the line, etc. The automatically releasing line clip greatly improves safety during use in elevated environments, as only one hand is required for use, allowing the user to maintain a grip upon the ladder, scaffold, or other structure during use.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a chalk box. In one embodiment, the chalk box has an electric motor that provides power to rewind the chalk line after use. In another embodiment, the chalk box has a remotely releasable line clip that makes it unnecessary for a person to grasp the line clip to remove it from its anchor point after laying out a line. The two embodiments may be used in combination to provide a motorized chalk box that is very convenient for construction workers, utility workers, and others having a need to mark a temporary line between distant points.

Figure 1:
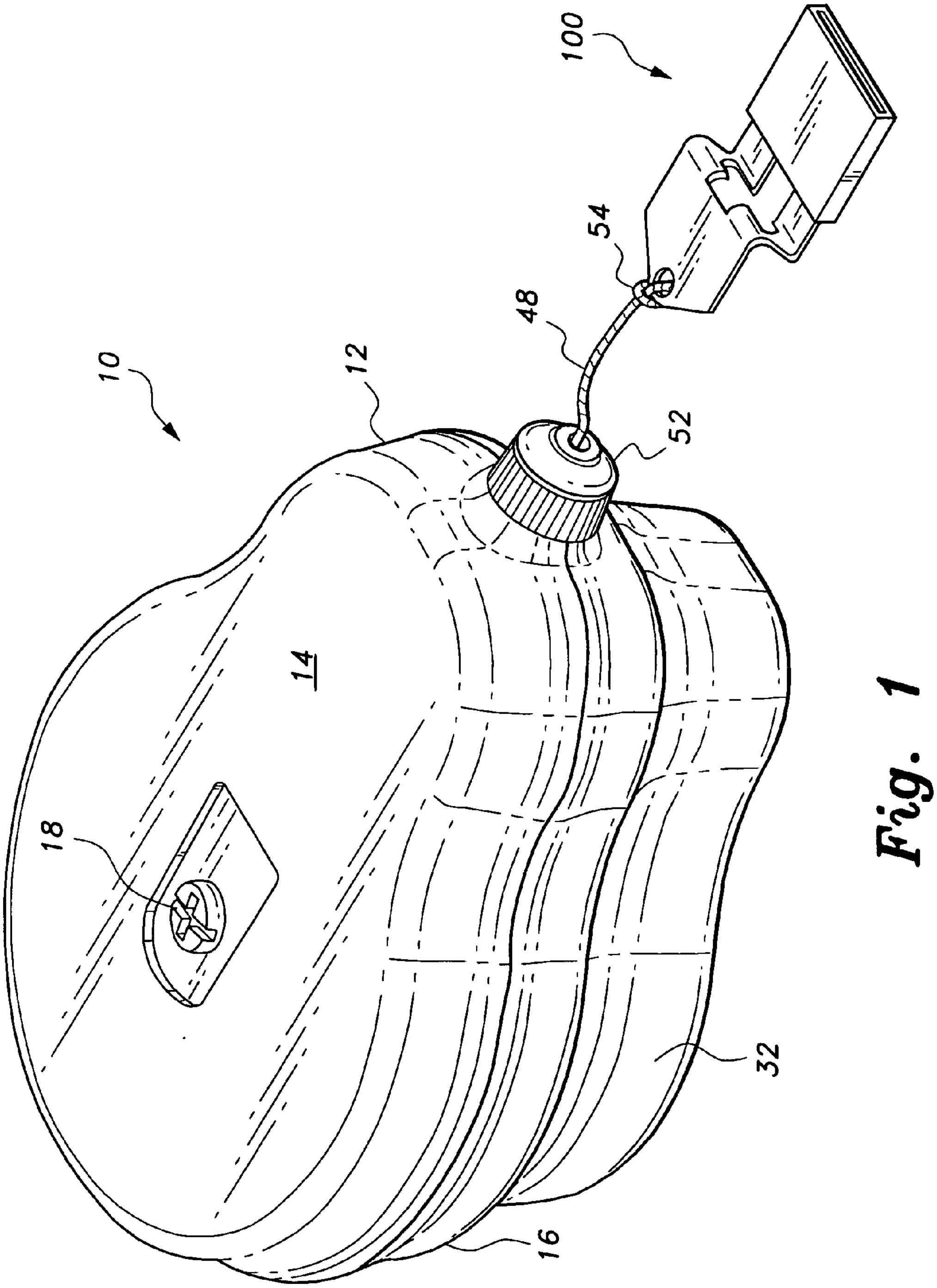
FIG. 1 is a perspective view of a motorized chalk box having an automatically releasing line clip according to the present invention.
Figure 2:
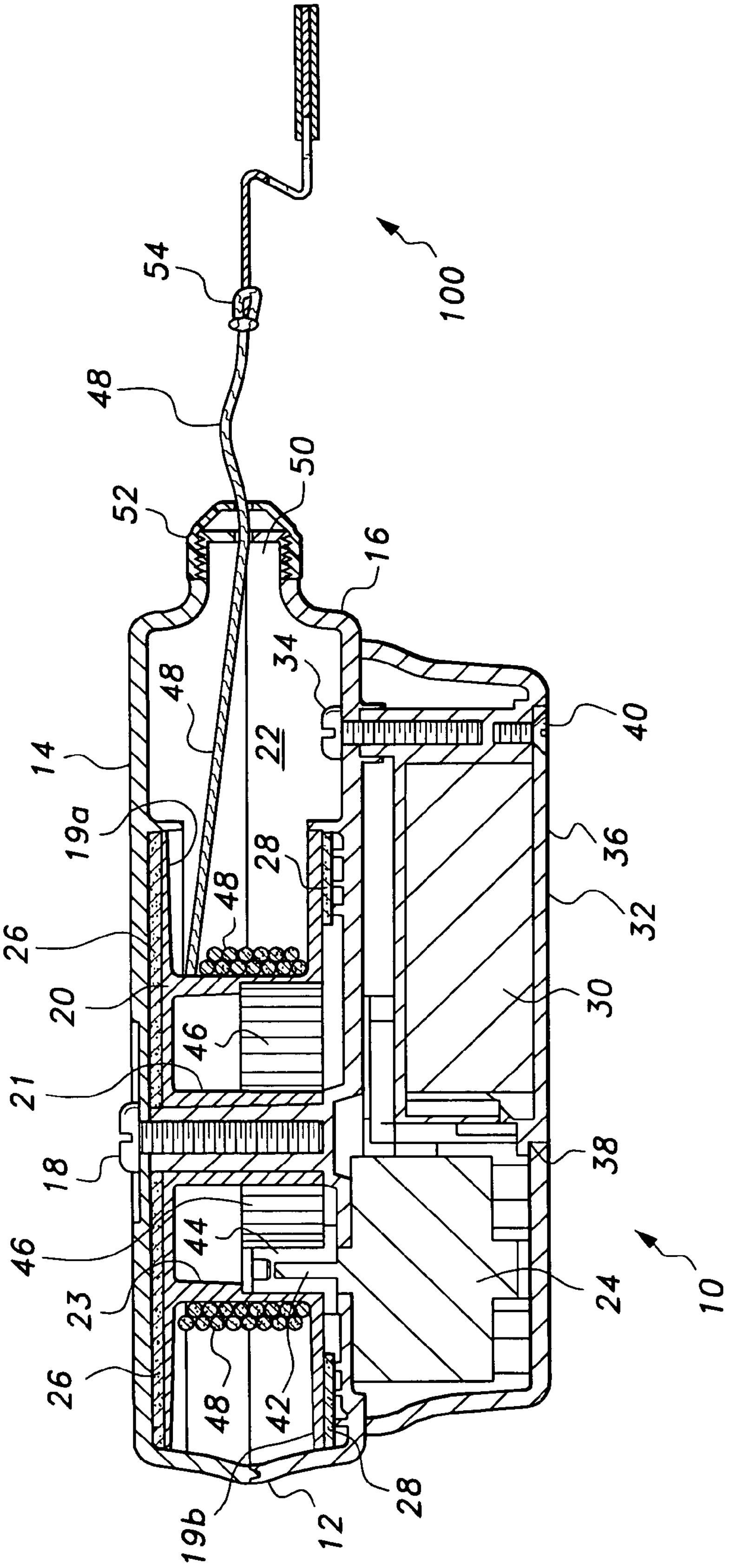
FIG. 2 is a right side elevation view in section of the motorized chalk box and the line clip, showing the internal structure thereof.

FIG. 1 provides a perspective view of the motorized chalk box 10 with an automatically releasable line clip 100, with FIG. 2 providing a side elevation view in section of the chalk box 10 and the line clip 100. The chalk box 10 includes a hollow housing 12 formed of a first shell 14 and a second shell 16, with the two shells 14 and 16 being secured to one another by a single housing assembly screw 18 to facilitate opening the shells for maintenance and repair of the components therein. A conventional belt clip (not shown) may be secured to the housing 12 by the housing assembly screw 18.

The housing 12 encloses a chalk line reel 20 and chalk dust reservoir 22 therein, with a reel drive motor 24 being disposed external to the housing 12. A first seal 26 is installed between the reel 20 and the inside of the first shell 14, with a second seal 28 installed between the reel 20 and the inside of the second shell 16 in order to preclude the passage of chalk dust past the reel 20 and into the motor 24. The electric motor 24 and its electrical storage cell or battery 30 is contained within a separate motor and battery compartment 32, which extends externally from the second shell 16. The motor and battery compartment 32 is removably secured to the second shell 16 of the housing 12 by a single motor and battery compartment screw 34, which extends from within the second shell 16 to engage a boss within the motor and battery compartment 32. The battery is accessed for recharging or replacement by a battery access panel 36 disposed externally to the battery compartment 32. The access panel 36 may be secured in place by a clip 38 at one end and a single screw 40 at the other end, to facilitate battery access as needed.

The electric motor 24 has a drive shaft 42 with a pinion gear 44 extending therefrom, which meshes with an internal ring gear 46 disposed within the chalk line reel 20. Reel 20 is formed from two parallel circular plates 19*a* and 19*b* maintained in spaced relation by an inner cylindrical wall 21 and an outer cylindrical wall 23. Inner cylindrical wall 21 defines a passage for a screw boss extending from shell 16 that receives housing assembly screw 18. Outer cylindrical wall 23 forms a hub around which the chalk line may be wound. The teeth of internal gear 46 are defined on the inner face of outer cylindrical wall 23. Pinion gear 44 is disposed between inner cylindrical wall 21 and outer cylindrical wall 23 and situated so that pinion gear 44 meshes with internal gear 46. This arrangement results in the drive shaft 42 and gearing 44 and 46 being located completely within the outer circumference of the reel 20, thereby providing a very compact assembly, long gear life with less wear than external gears, and quiet operation. The motor 24 is selectively actuated by a conventional switch (not shown).

A pervious chalk line 48 (e.g., Nylon cord, etc.) is wound about the reel 20, bearing against outer cylindrical wall 23, and extends through the chalk dust reservoir 22 to exit the housing 12 through a chalk line outlet passage 50. The line outlet passage 50 has a line outlet guide and chalk dust reservoir cap 52 removably installed thereon, to allow the reservoir 22 to be refilled with chalk dust as required. The chalk line 48 extends through the line outlet guide and cap 52 to its distal end 54, which attaches to the line clip assembly 100.

Figure 3A:
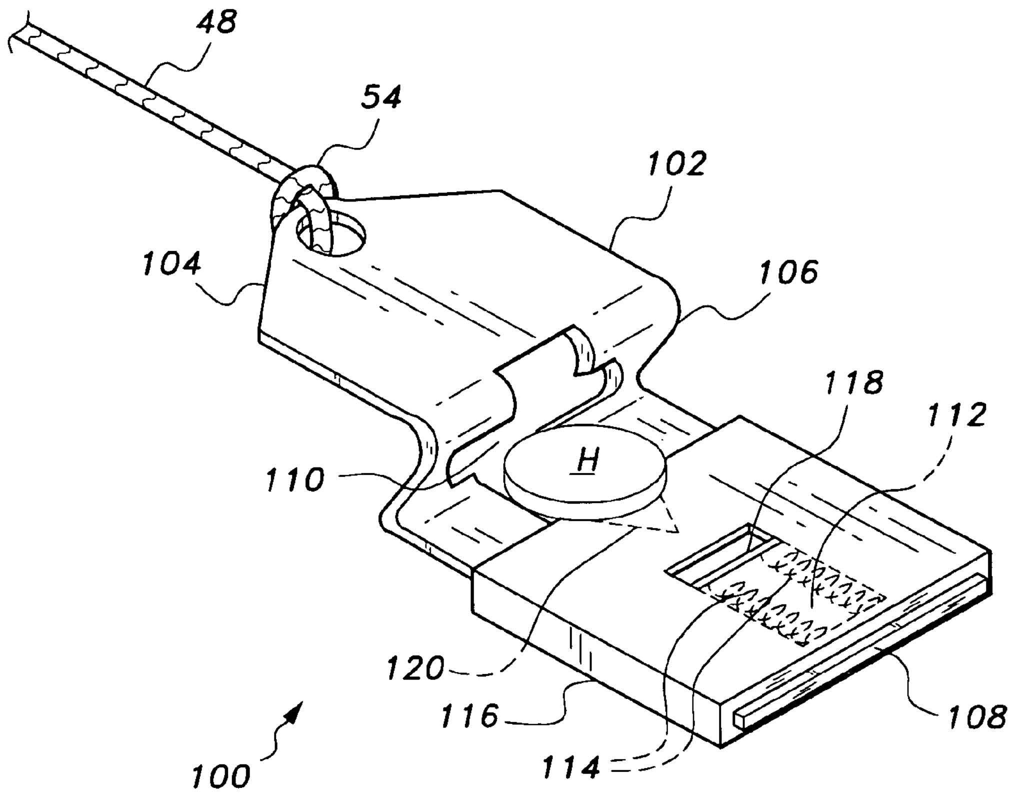
FIGS. 3A, 3B and 3C are perspective views showing action of the line clip when being released from an anchor.
Figure 3B:
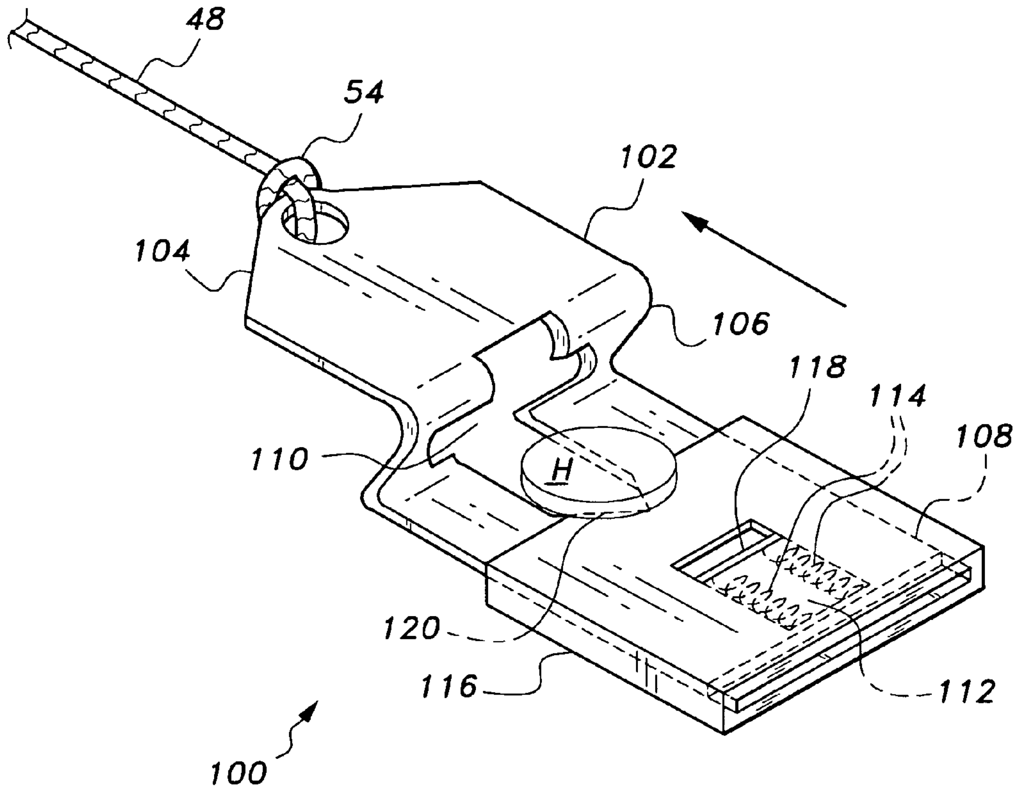
Figure 3C:
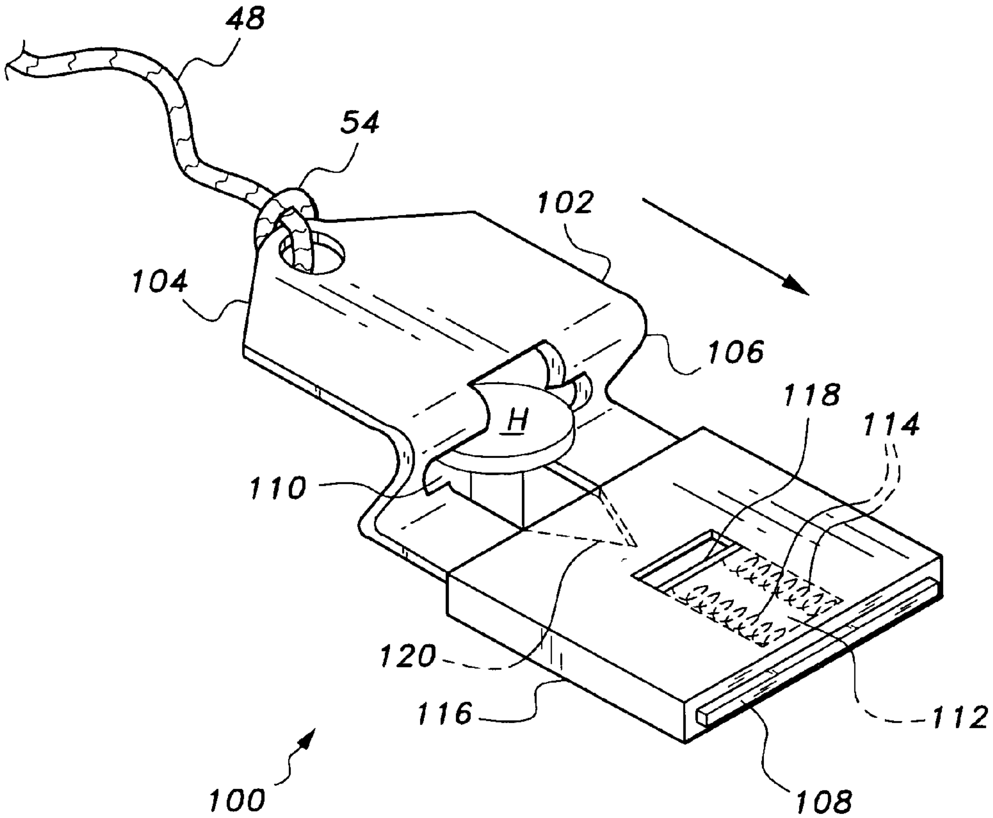

FIGS. 3A through 3C illustrate the structure and operation of the automatically releasable line clip assembly 100. The line clip 100 comprises a generally Z-shaped body or plate 102 formed of a flat sheet of material (e.g., steel, etc.). The body 102 includes a line attachment end 104 to which the distal end 54 of the chalk line 48 is secured, an offset medial portion 106 comprising the Z-shaped bend, and a tongue portion 108 opposite the line attachment end 104. The medial portion 106 includes an anchor engagement slot 110 formed therein, configured to allow the passage of the head H of an anchoring device (e.g., nail, screw, etc.) therethrough. The tongue portion 108 includes a spring slot 112 formed therein, with at least one compression spring 114 installed within the spring slot 112; two such springs 114 are shown in FIGS. 3A through 3C in broken lines within the spring slot 112.

A flat sleeve 116 is installed about the tongue portion 108 of the line clip body 102, and slides longitudinally along the tongue portion 108. The sleeve 116 includes an inwardly bent spring engagement tab 118 which extends into the spring slot 112 to bear against the spring(s) 114, the spring(s) being captured between the tab 118 and the distal end of the spring slot 112. The spring(s) 114 are captured within the slot 112 by the surrounding sleeve 116 and its engagement tab 118.

Normally, the compression spring(s) 114 bear against the engagement tab 118 of the sleeve 116, pushing the sleeve toward the medial portion 106 of the body 102 and its anchor engagement or clearance slot 110, generally as shown in FIG. 3A of the drawings. However, when tension is applied to the chalk line 48, the anchor or head H of the anchor bears against the inner end of the sleeve 116, preventing the sleeve 116 from moving as the body portion 102 is pulled, compressing the compression spring(s) 114. This results in the body portion 102, and particularly the tongue portion 108 thereof, extending from the sleeve 116 in the direction indicated by the arrow in FIG. 3B, with the narrow distal end 120 of the anchor engagement slot 110 engaging the shank of the anchor to center the line clip 100 on the anchor. The chalk line 48 may now be snapped to produce the desired guideline on the workpiece.

When the guideline has been marked, generally as described above, the user of the present chalk box need only suddenly release the tension on the chalk line 48, as shown in FIG. 3C. This causes the spring(s) 114 to expand and kick against the body portion 102 of the clip, causing the body portion to retract suddenly into the sleeve 116 in the direction of the arrow shown in FIG. 3C. As the sleeve 116 is retained from further movement toward the anchor and chalk line 48 due to the anchor, the reactive force results in the body portion 102 of the clip 100 suddenly thrusting away from the now slack chalk line 48 as the tongue portion 108 is suddenly retracted into the sleeve 116 due to the force of the spring(s) 114. This results in the entire clip assembly 100 being kicked away from the anchor, thereby freeing the clip 100 from the anchor and allowing the user of the device to retract the chalk line 48 and clip assembly 100 by means of the motor 24 and reel 20, as described further above.

In conclusion, the present motorized chalk box greatly simplifies the marking of a reference or guideline on a workpiece, enabling a single worker to complete the job efficiently. The worker need only position an anchor (nail, screw, etc.) at the proper location, hook the clip assembly over the anchor, and extend the chalk line from the clip assembly to the opposite reference point. The line is then drawn taut and snapped to mark the reference or guideline. The user of the present chalk box may then suddenly release the tension on the chalk line, causing the clip assembly to kick back from the anchor to release the clip from the anchor and allow the user to retract the chalk line by means of the motorized reel. The Z-bend of the clip assembly also allows the clip to be hooked over the edge of a panel or other workpiece, where applicable, thereby precluding the need for a separate anchor screw or nail for the clip. Thus, the present motorized chalk box greatly facilitates the forming or marking of a reference line or guideline by a single individual, thereby saving time and labor for the user.

It is to be understood that the present invention is not limited to the embodiment described above, but encompasses any and all embodiments within the scope of the following claims.

We claim:

1. A chalk box assembly, comprising:

a hollow housing having a chalk line outlet passage and a reservoir adapted for holding chalk defined therein;

a chalk line reel disposed within said housing;

a chalk line wound upon said reel, said chalk line having a distal end exiting the housing through the chalk line outlet passage;

an electric motor selectively driving said chalk line reel in order to retract the chalk line; and a spring-loaded, remotely releasable line clip assembly attached to the distal end of said chalk line, the assembly having:

a body defining an anchor-engaging slot and a spaced apart spring slot;

a sleeve slidable on the body and including a spring engagement tab extending into said spring slot; and at least one compression spring disposed within the spring slot of the body wherein the spring engagement tab bears against the spring thereby biasing the sleeve away from the anchor-engaging slot, the spring being compressed when the body is placed over an anchor and tension is applied to the chalk line, and expanded to eject the body from the anchor when the chalk line is released.

2. The chalk box assembly according to claim 1, further including:

an internal ring gear disposed within said chalk line reel;

a drive shaft extending from said electric motor; and a pinion gear disposed upon said drive shaft, the pinion gear meshing with the internal ring gear.

3. The chalk box assembly according to claim 1, wherein:

said body comprises a generally Z-shaped body formed of a flat sheet of material, the body having a line attachment end, an offset medial portion, and a tongue portion opposite the line attachment end, the anchor-engaging slot being defined in a medial portion, the spring slot being defined in the tongue portion; and said sleeve is slidable on the tongue portion of said body.

4. The chalk box assembly according to claim 1, wherein said housing further comprises:

a first shell;

a second shell;

a first fastener removably securing said first shell and said second shell to one another;

a motor and battery compartment disposed externally to said second shell; and a second fastener extending from within said second shell removably securing said motor and battery compartment to said second shell.

5. The chalk box assembly according to claim 4, further including:

a first seal disposed between said first shell and said reel; and a second seal disposed between said second shell and said reel.

6. The chalk box assembly according to claim 1, further comprising a line outlet guide and chalk dust reservoir cap removably disposed over said line outlet passage.

7. The chalk box assembly according to claim 1, further including:

a motor and battery compartment disposed externally to said housing; and a battery access panel disposed externally upon said motor and battery compartment.

8. A chalk box assembly, comprising:

a hollow housing having a chalk line outlet passage and a reservoir adapted for containing chalk defined therein a chalk line reel disposed within the housing;

a chalk line wound upon the reel, the chalk line having a distal end extending through the chalk line passage; and a spring loaded, remotely releasable line clip assembly secured to the distal end of the chalk line, the clip assembly having;

a generally Z-shaped body formed of a flat sheet of material, the body having a line attachment end, an offset medial portion, and a tongue portion opposite the line attachment end, the medial portion having an anchor engagement slot defined therein, the tongue portion having a spring slot defined therein;

a flat sleeve slidably disposed about the tongue portion of the body, the sleeve having a spring engagement tab extending into the spring slot; and at least one spring disposed within the spring slot of the body, the spring tab bearing against the spring, the spring biasing the sleeve away from the anchor engagement slot;

wherein tension applied to the chalk line slides the tongue out of the sleeve to bear against an anchor when the anchor engagement slot is disposed over the anchor, and the spring biases the tongue back into the sleeve when the tension is released in order to automatically remove the line clip from the anchor.

9. The chalk box assembly according to claim 8, further including:

an internal ring gear disposed within said chalk line reel;

an electric motor;

a drive shaft extending from said electric motor; and a pinion gear disposed upon said drive shaft, the pinion gear meshing with said internal ring gear, whereby the motor retracts the chalk line when actuated.

10. The chalk box assembly according to claim 8, wherein said housing further comprises:

a first shell;

a second shell;

a first fastener removably securing said first shell and said second shell to one another;

a motor and battery compartment disposed externally to said second shell; and a second fastener extending from within said second shell removably securing said motor and battery compartment to said second shell.

11. The chalk box assembly according to claim 10, further including:

a first seal disposed between said first shell and said reel; and a second seal disposed between said second shell and said reel.

12. The chalk box assembly according to claim 8, further comprising a line outlet guide and chalk dust reservoir cap removably disposed over said line outlet passage.

13. The chalk box assembly according to claim 8, further including:

a motor and battery compartment disposed externally to said housing; and a battery access panel disposed externally upon said motor and battery compartment.

* * * * *